United States Patent [19]
Lauritzen

[11] Patent Number: 5,617,347
[45] Date of Patent: Apr. 1, 1997

[54] CACHE MEMORY SYSTEM AND METHOD THEREOF FOR STORING A STAGED MEMORY ITEM AND A CACHE TAG WITHIN A SINGLE CACHE ARRAY STRUCTURE

[75] Inventor: Mogens Lauritzen, Los Altos, Calif.

[73] Assignee: Fujitsu Limited, Kawasaki, Japan

[21] Appl. No.: 406,305

[22] Filed: Mar. 17, 1995

[51] Int. Cl.$^6$ ............................................. G11C 15/00
[52] U.S. Cl. .................. 365/49; 365/189.07; 365/230.03
[58] Field of Search ......................... 365/49, 189.07, 365/230.03; 395/375, 445, 427

[56] References Cited

U.S. PATENT DOCUMENTS

| | | | |
|---|---|---|---|
| 5,067,078 | 11/1991 | Talgam et al. | 395/400 |
| 5,210,845 | 5/1993 | Crawford et al. | 395/425 |
| 5,226,009 | 7/1993 | Arimoto | 365/49 X |
| 5,228,134 | 7/1993 | MacWilliams et al. | 395/425 |
| 5,274,790 | 12/1993 | Suzuki | 395/425 |
| 5,285,323 | 2/1994 | Hetherington et al. | 395/425 |
| 5,293,603 | 3/1994 | MacWilliams et al. | 395/425 |
| 5,301,296 | 4/1994 | Mohri et al. | 395/425 |
| 5,307,477 | 4/1994 | Taylor et al. | 395/425 |
| 5,339,399 | 8/1994 | Lee et al. | 395/425 |
| 5,345,576 | 9/1994 | Lee et al. | 395/425 |
| 5,353,424 | 10/1994 | Partovi et al. | 395/425 |
| 5,471,415 | 11/1995 | McClure | 365/49 |
| 5,499,204 | 3/1996 | Barrera et al. | 365/49 |

OTHER PUBLICATIONS

Harold S. Stone, *High–Performance Computer Architecture*, Addison–Wesley (2d ed. 1990), pp. 29–87.

*Primary Examiner*—David C. Nelms
*Assistant Examiner*—Son T. Dinh
*Attorney, Agent, or Firm*—Christie, Parker & Hale, LLP

[57] ABSTRACT

An embodiment of the present invention is a cache memory system for providing memory items staged from an, external memory to a logic unit. The system consists of a cache array comprising at least one single cache array structure wherein one such single cache array structure consists of a plurality of cache entries. Each of the cache entries consists of a memory item section for storing at least a portion of a memory item and a cache tag section for storing at least a portion of a cache tag. Each such cache tag identifies at least one of the cache entries. The cache array is responsive to address signals for reading out the contents of at least one of the cache entries. The system further consists of a logic circuit responsive to memory requests for generating the address signals and consists of a circuit for comparing the cache tags to the memory requests for a predetermined relationship. The system further consists of an address bus interconnecting the cache array and the logic circuit for carrying the address signals to the cache array and a data bus interconnecting the cache array and the logic circuit for carrying the cache tags and the memory items between the cache array and the logic circuit.

26 Claims, 13 Drawing Sheets

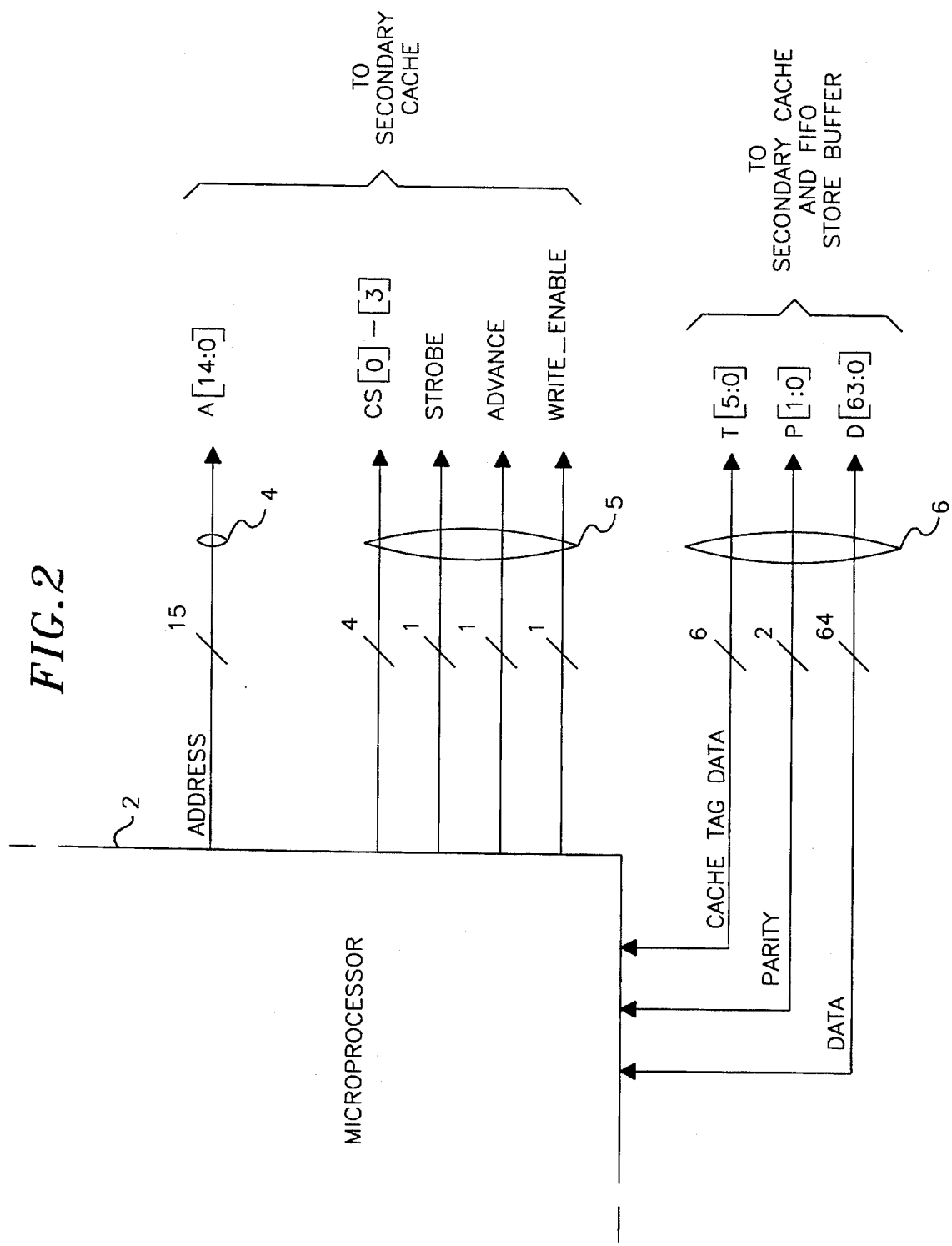

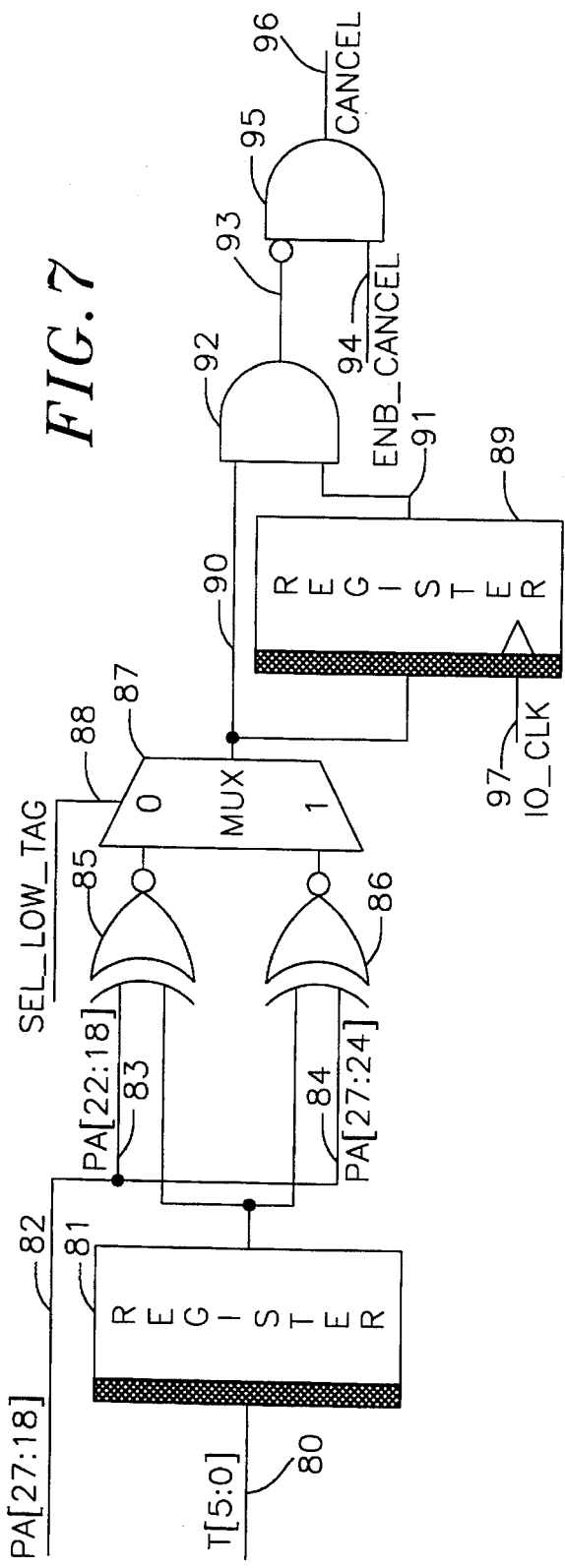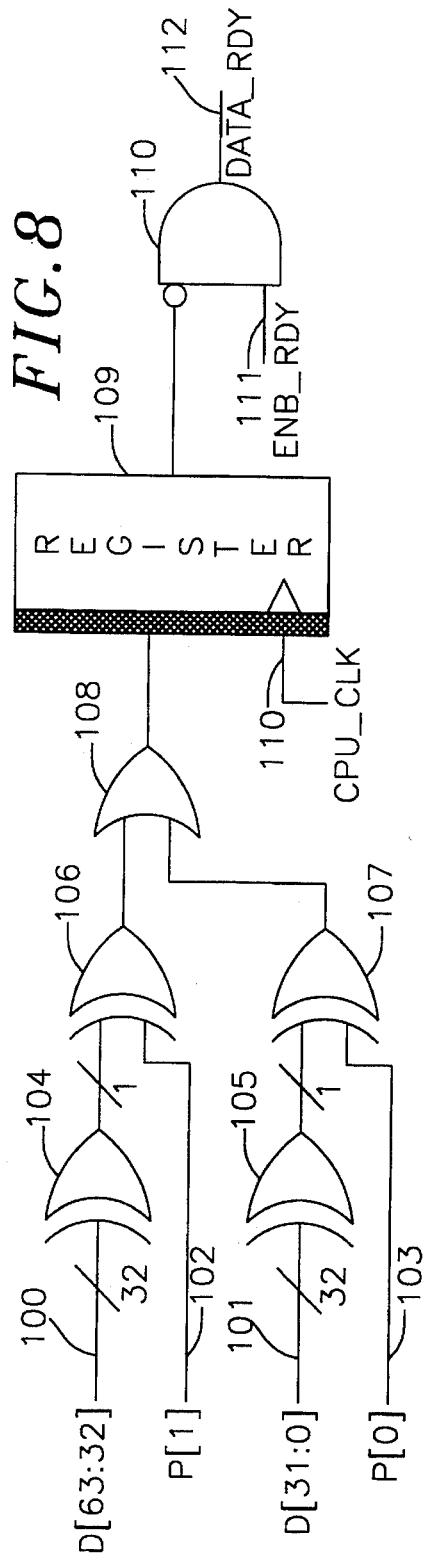
FIG.7
FIG.8

CACHE MEMORY SYSTEM AND METHOD THEREOF FOR STORING A STAGED MEMORY ITEM AND A CACHE TAG WITHIN A SINGLE CACHE ARRAY STRUCTURE

FIELD OF THE INVENTION

The present invention relates in general to cache memory systems and methods thereof, and in particular to cache memory systems and methods thereof for storing a staged memory item and a cache tag within a single cache array structure.

BACKGROUND OF THE INVENTION

Modern computer systems employ hierarchical memory designs that order storage devices in terms of access time and storage capacity. Cache memory systems are at the top of the hierarchy with the fastest access times and smallest storage capacities, such as shown in H. S. Stone, *High-Performance Computer Architecture,* Addison-Wesley (2d ed. 1990), pp. 29–87, the disclosure of which is hereby incorporated by reference. These are used to store the most frequently used sections of computer programs and data. Below these in the hierarchy, in order of decreasing access time and increasing storage capacity, are main memory and secondary storage. Memory caches are used to store two kinds of memory items staged from main memory: program instructions and data, the former of which is treated as read-only.

Cache memory systems are divided into two types: primary or level-1 caches, which are located on-chip as an integral part of the central processing unit (CPU), and secondary or level-2 caches, which are external to the CPU. Although providing faster access times, primary caches are of fixed storage capacity since size, power consumption and other engineering concerns with respect to the CPU can limit the primary cache design.

By contrast, since secondary caches are separate physical components from the CPU and are therefore not subject to such concerns, they can be increased in capacity by adding additional memory chips. Typically, static random access memory (SRAM) chips are used since they provide faster access times than conventional dynamic random access memory (DRAM) chips.

The capacities of secondary memory caches are generally significantly smaller than that of main memory and cache tags must be used to identify the main memory locations to which each cache entry corresponds. Consequently, two separate entities of memory chips are used whereby an entity can be one or more discrete memory chips with one entity storing the staged memory items and the other entity storing the cache tags. Examples of secondary memory caches employing separate entities of memory chips to store staged memory items and cache tags are disclosed in U.S. Pat. No. 5,210,845 to Crawford et al.; U.S. Pat. No. 5,339,399 to Lee et al.; U.S. Pat. No. 5,239,603 and U.S. Pat. No. 5,228,134, both to MacWilliams et al.

Problems resulting from the use of separate memory array structures for storing staged memory items and cache tags are increased architectural complexity, increased manufacturing costs and decreased operational speed by virtue of additional components.

SUMMARY OF THE INVENTION

The present invention enables the above problems to be overcome using a single memory array structure for storing staged memory items (program instructions or data) and cache tags wherein the cache tags are distributed over consecutive cache entries spanning a plurality of memory chips and the tags are reassembled by performing successive reads to the secondary memory cache array structure.

An embodiment of the present invention is a cache memory system for providing memory items staged from an external memory to a logic unit. The system consists of a cache array comprising at least one single cache array structure wherein one such single cache array structure consists of a plurality of cache entries. Each of the cache entries consists of a memory item section for storing at least a portion of a memory item and a cache tag section for storing at least a portion of a cache tag. Each such cache tag identifies at least one of the cache entries. The cache array is responsive to address signals for reading out the contents of at least one of the cache entries. The system further consists of a logic circuit responsive to memory requests for generating the address signals and consists of a circuit for comparing the cache tags to the memory requests for a predetermined relationship. The system further consists of an address bus interconnecting the cache array and the logic circuit for carrying the address signals to the cache array and a data bus interconnecting the cache array and the logic circuit for carrying the cache tags and the memory items between the cache array and the logic circuit.

An embodiment of the present invention is also a cache memory system for selectively providing memory items, which are staged from a main memory to a cache memory, either from such main memory or, if present therein, from the cache memory. The system consists of the cache memory storing a plurality of memory items, and corresponding to each memory item a duplicate cache tag. Each of the duplicates of the duplicate cache tag for each memory item identifies the corresponding memory item. The plurality of memory items each comprise a plurality of memory item portions. Each memory item portion has stored in association therewith one of the duplicates of the duplicate cache tags. The cache tag memory is responsive to received addresses for reading out the memory items and the corresponding one of the duplicates of one of the cache tags. The system further consists of a logic circuit responsive to requests for memory access to the main memory for generating addresses. The logic circuit consists of a circuit for comparing each of the one of the duplicates of one of the cache tags before the other duplicate for a predetermined relationship. The system further consists of at least one bus for carrying the addresses and the memory items and the corresponding the one of the duplicates of one of the cache tags between the cache memory structure and the logic circuit.

Still other embodiments of the present invention will become readily apparent to those skilled in the art from the following detailed description, wherein is shown and described only embodiments of the invention by way of illustration of the best modes contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

FIG. 2 is a wiring diagram of the address bus and control signals communicated between the microprocessor and the secondary cache and the data bus for the cache memory system;

FIG. 7 is a logic diagram showing a cache hit or miss detection circuit;

FIG. 8 is a logic diagram showing a cache entry parity checking circuit;

DETAILED DESCRIPTION

The present invention relates to a secondary memory cache in which the cache tags are formed by combining four three-bit segments distributed over two separate static random access memory (SRAM) chips. One embodiment is implemented on a SPARC® (Scalable Processor Architecture) microprocessor that utilizes a Reduced Instruction Set Computer (RISC) design with a pipelined execution unit. SPARC® is a trademark of Sun Microsystems of Mountain View, Calif.

The present invention further relates to a secondary memory cache in which duplicate cache tags are broken into portions stored in multiple locations in the secondary cache in an environment in which reads to multiple storage locations are required to retrieve a full cache tag whereby the utilization of redundant cache tags enables the detection of a cache hit or a cache miss prior to the time at which all of the multiple storage locations for the cache line have been read.

Figure 1:
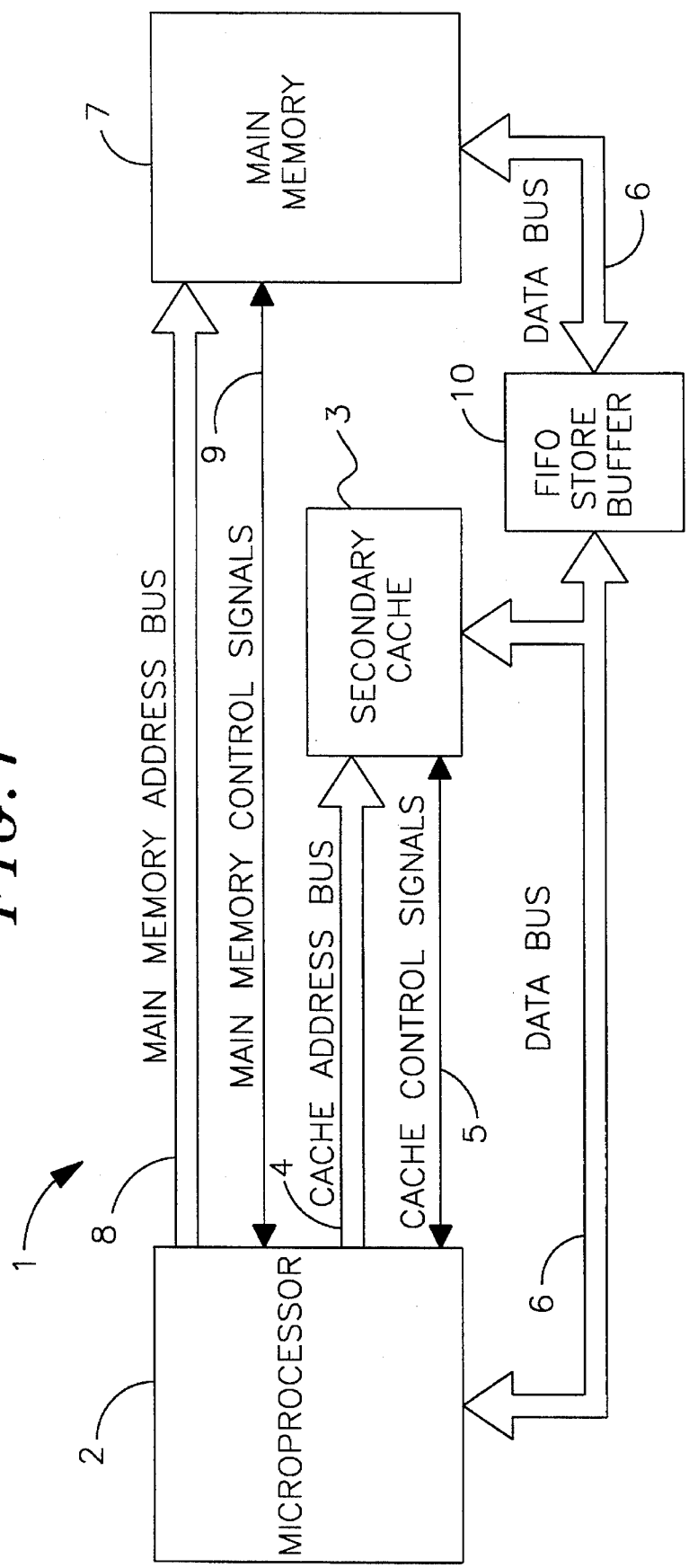
FIG. 1 is a schematic diagram of a cache memory system as an embodiment of the present invention.

Referring to FIG. 1, a schematic diagram of a cache memory system embodying the present invention is shown. The cache memory system 1 consists of a logic unit such as microprocessor 2 connected to a secondary cache 3 containing shared cache data and cache tags with a cache address bus 4 and a set of cache control signals 5. The microprocessor 2 is also connected to a main memory 7 with a main memory address bus 8 and a set of main memory control signals 9. Both the secondary cache 3 and the main memory 7 transfer memory items to and from the microprocessor using a shared data bus 6. A four-deep first-in, first-out (FIFO) bidirectional store buffer 10 is used to buffer memory items being written to main memory from the microprocessor.

An execution unit (not shown) within the microprocessor generates memory read requests consisting of 28-bit physical main memory addresses. If a full 32-byte cache line is requested, a secondary cache lookup is initiated in parallel with a main memory lookup. If the requested memory item is found in the secondary cache, the lookup to main memory is cancelled. Otherwise, the requested memory item is retrieved from main memory and the appropriate location in the secondary cache is updated with the retrieved main memory item upon its becoming available.

The execution unit also generates memory write requests. The cache memory system uses a write-through cache coherency protocol. If a full cache line is written, the new data is written simultaneously to the secondary memory cache and main memory with the secondary cache tag being updated using a new tag physical address.

The secondary cache 3 is accessed through direct address mapping. Direct address mapping means that an address sent to the secondary cache 3 over the address bus 4 directly refers to a unique location in the cache. The microprocessor 2 forms a request for a memory access in the form of a 28-bit physical address for a location in main memory 7.

The 28-bit physical address is divided into three components. The first three bits ADDR[2:0] are used internally by the execution unit to select one byte within a 64-bit double word corresponding to a single cache entry. The next 15 bits ADDR[17:3] are sent over cache address bus 4 in FIG. 2 A[14:0] to select a cache entry. The secondary cache 3 is responsive to the 15-bit address being asserted on cache address bus 4 and the secondary cache 3 begins reading out cache entries. Lookups to the secondary cache are performed using 32-byte cache lines which consist of four 64-bit cache entries. The remaining ten bits ADDR[27:18] are used internally by the microprocessor to detect a cache hit or cache miss by comparing these ten bits to a secondary cache tag. A match between a cache tag and bits ADDR[27:18] is a cache hit and a mismatch between a cache tag and bits ADDR[27:18] is a cache miss. Both the cache hit and the cache miss are indicated within the microprocessor by signals to the execution unit.

Referring to FIG. 2, a wiring diagram illustrating the address bus and control signals communicated between the microprocessor and the secondary cache and the data bus for the cache memory system is shown. The cache address bus 4 comprises one set of address lines for carrying 15 bits of address data A[14:0]. These 15 bits are from the physical address ADDR[17:3]. This is used as an absolute address in the secondary cache to identify a cache entry. The cache control signals 5 include four sets of signals, including one set of three chip select signals CS[0]–[3] for selecting a memory chip to access, and four one-bit signal lines for transmitting a strobe signal, an advance signal, and a write enable signal to the secondary cache.

The data bus 6 consists of three groups of data lines which carry 72 bits of data. The first group carries six bits of cache tag data T[5:0]. The second group carries two bits of parity P[1:0]. The third group carries 64 bits of cache data D[63:0]. The cache tag data lines are used exclusively by the microprocessor 2 and the secondary cache 3.

Figure 3A:
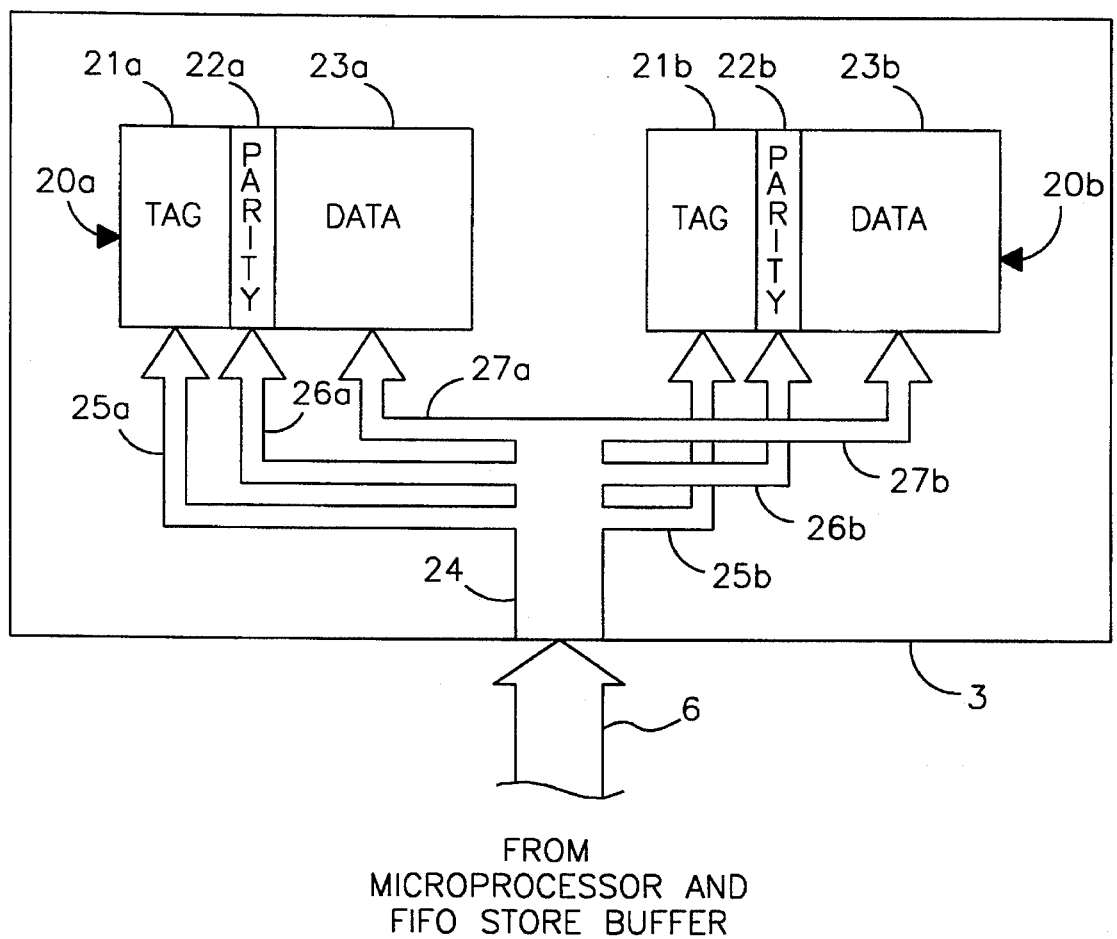
FIGS. 3a, 3b and 3c are schematic diagrams of three configurations of the secondary cache.
Figure 3B:
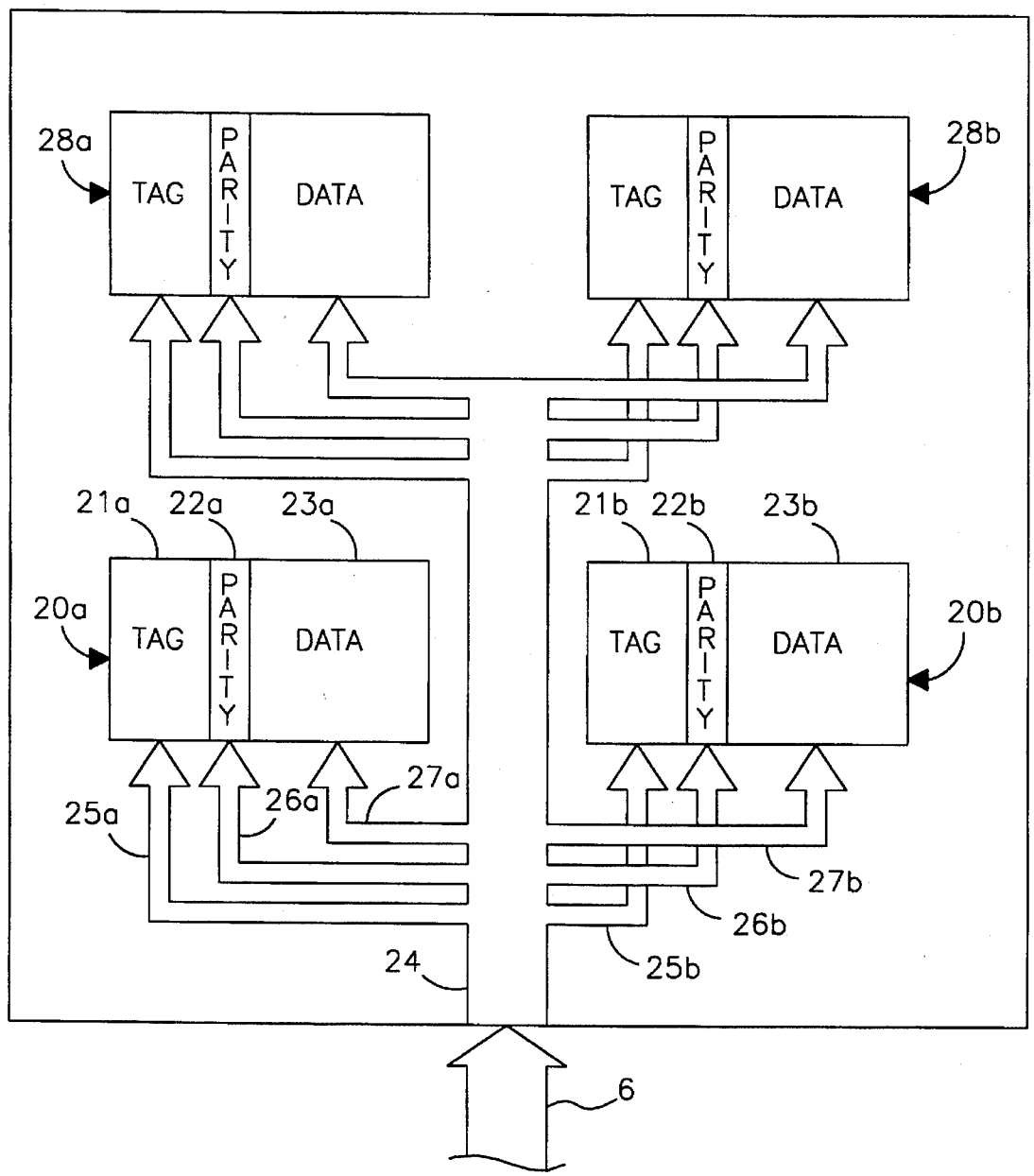
Figure 3C:
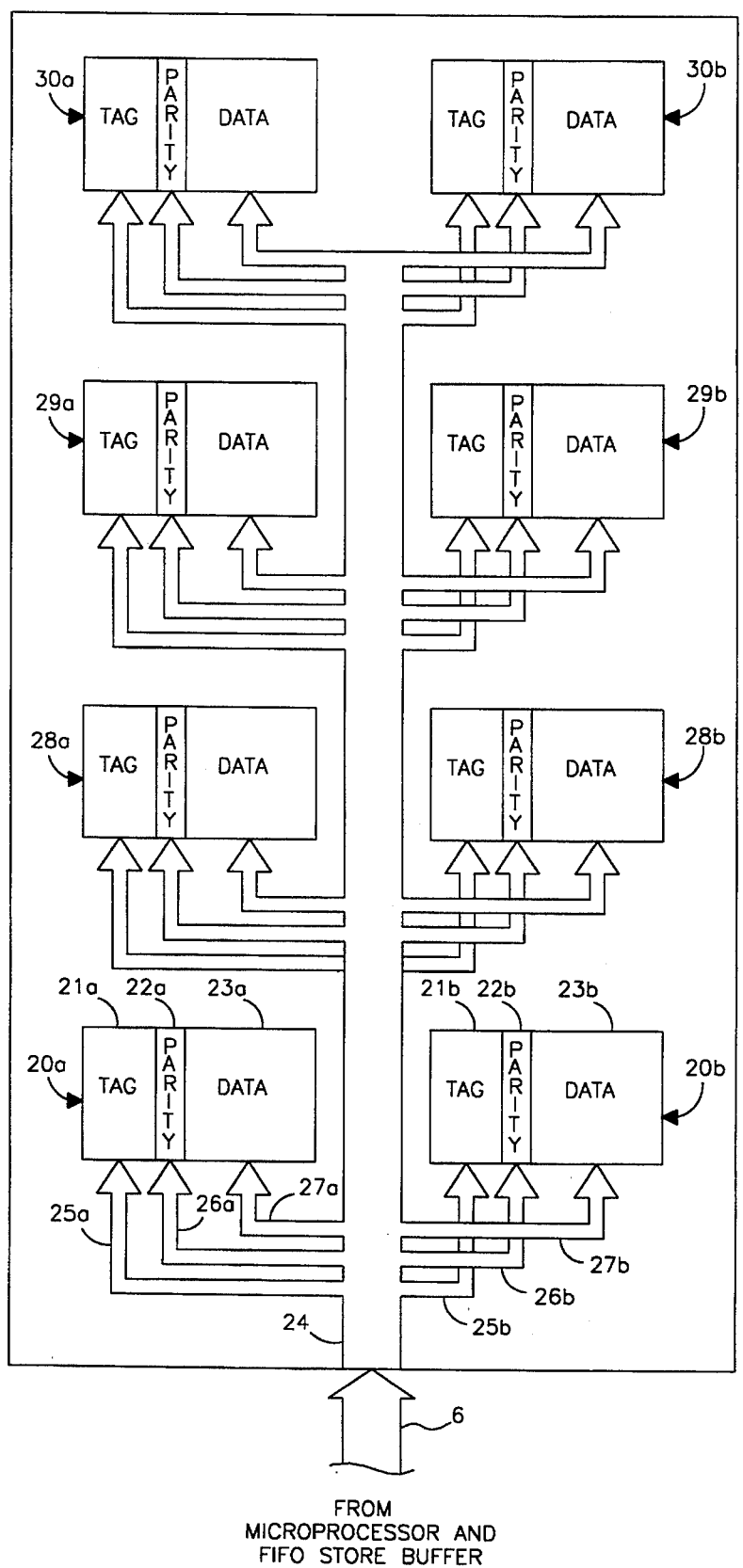

Referring to FIGS. 3a, 3b and 3c, schematic diagrams of three configurations of the secondary cache 3 are shown. The secondary cache can be configured in any number of capacities including, by way of example, a 256 KB (kilobyte) cache (FIG. 3a), a 512 KB cache (FIG. 3b), or a 1 MB (megabyte) cache (FIG. 3c) whereby the capacity is determined by the number of memory chips used. The 256 KB configuration uses one pair of memory chips (20a and 20b). The 512 KB configuration uses two pairs of memory chips (20a and 20b, 28a and 28b). The 1 MB configuration uses four pairs of memory chips (20a and 20b, 28a and 28b, 29a and 29b, and 30a and 30b).

The chip select signals CS[0]–[3] (shown in FIG. 2) are used to select the desired pair of memory chips whereby a signal asserted on CS[0] selects chip pair 20a and 20b, CS[1] selects chip pair 28a and 28b, CS[2] selects chip pair 29a and 29b, and CS[3] selects chip pair 30a and 30b.

In an embodiment of the present invention, each memory chip comprises a static random access memory (SRAM) chip with 32 KB by 36 bits of data. An example of an SRAM chip would be a Fujitsu 32K×36 MB82VP036 SRAM memory chip.

The following discussion focuses on a 256 KB configuration but applies equally to the 512 KB and 1 MB configurations.

Referring to FIG. 3a, a secondary cache configured as a 256 KB cache is shown comprising one pair of memory chips 20a and 20b. Each memory chip is a single cache array structure consisting of 32,768 36-bit individually addressable entries. Each 36-bit entry contains 32 bits (or 4 bytes) of data, one parity bit, and three bits of cache tag data. Cache entries are always retrieved in pairs and each 72-bit pair is thus referred to as a cache entry. A cache line consists of four contiguously-stored cache entries, starting on a 32-byte address boundary, and contains 32 bytes of data (eight bytes per cache entry×four entries per cache line).

Typically, one or more cache array structures are used to store staged memory items (data) and corresponding parity bits and one or more cache array structures are used to store cache tags. In the present invention, however, extra space in the one or more of the data cache array structures is used to store cache tags so as to eliminate the need for storing cache tags in a separate, dedicated structure.

Each single cache array structure is logically divided into three columns for storing cache data, parity bits, and cache tags. Referring to FIG. 3a, cache tags are stored in columns 21a and 21b for memory chips 20a and 20b, respectively. Similarly, parity bits are stored in columns 22a and 22b and cache data in columns 23a and 23b.

Seventy-two bits of data are transmitted between the secondary cache and the microprocessor per access. The data bus 6 connects to an internal data bus 24 for the secondary cache 3. The internal data bus branches off at each cache array structure to retrieve three bits of cache tag data, one bit of parity and 32 bits of cache data using cache tag segment buses 25a and 25b, parity segment buses 26a and 26b, and cache data segment buses 27a and 27b.

Figure 4:
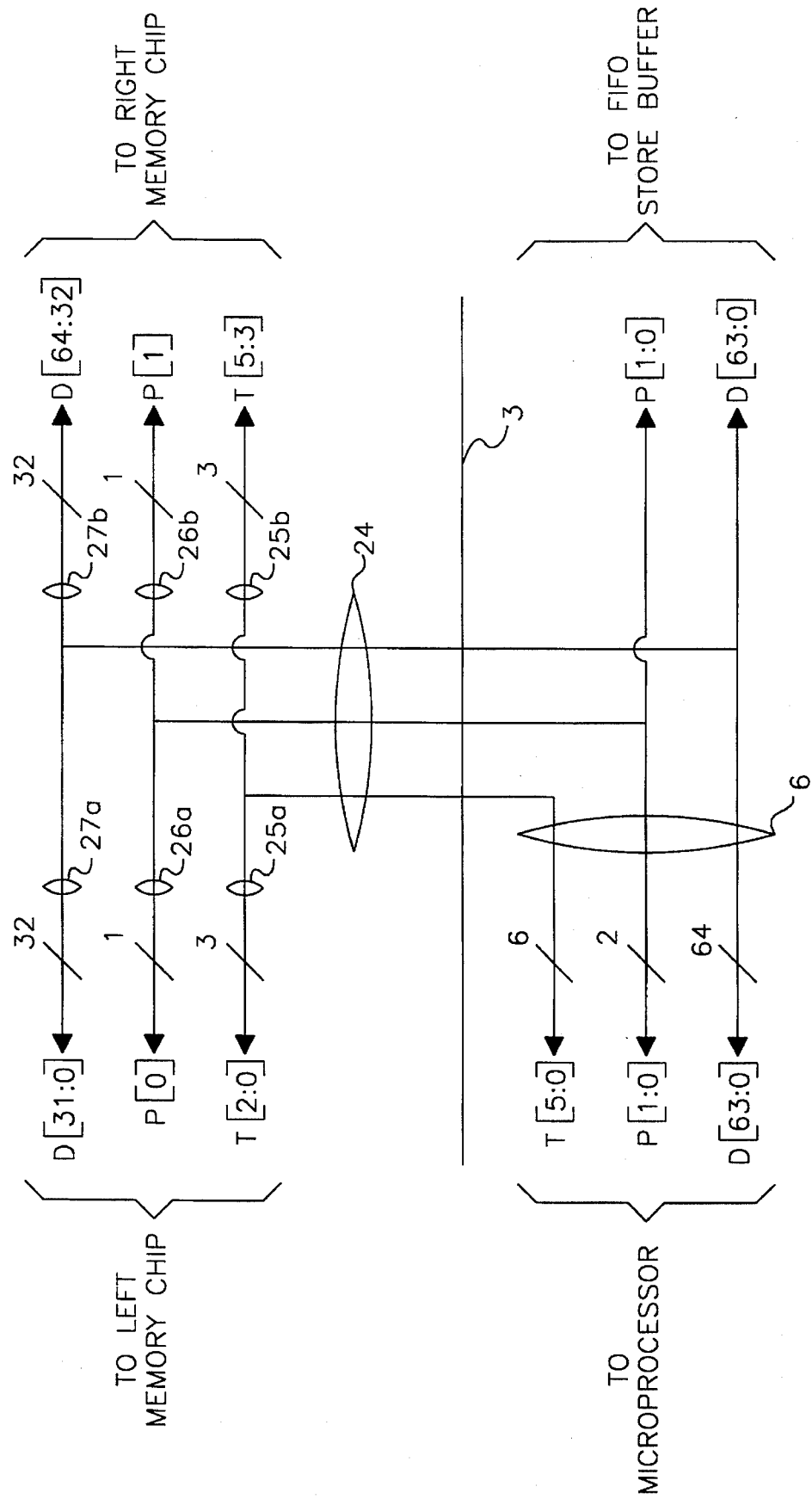
FIG. 4 is a wiring diagram of the internal buses used in the secondary cache.

Referring to FIG. 4, a wiring diagram of the internal buses used in a 256 KB configuration of the secondary cache is shown. Similar internal buses are used in a 512 KB or a 1 MB configuration of the secondary cache. The data bus 6 and internal data bus 24 carry the same data, although the group of six lines for carrying cache tag data is shared exclusively between the microprocessor and the secondary cache and does not extend to main memory. The cache tag segment buses 25a and 25b divide the cache tag into two three-bit segments, T[2:0] and T[5:3], respectively. The parity bit segment buses 26a and 26b divide the parity bits into two one-bit segments P[0] and P[1], respectively. The cache data segment buses 27a and 27b divide the cache data into two 32-bit segments D[31:0] and D[64:32], respectively.

Figure 5:
FIG. 5 is a diagram of a cache tag.

Four successive reads to four contiguous cache entries in the secondary cache are required to read one cache line. A complete cache tag, however, can be stored in just two of the four cache entries comprising the cache line. Referring to FIG. 5, a diagram of a cache tag is shown. The cache tag is 12 bits long consisting of three fields. The physical address field, consisting of bits 0 through 9, contains the 10 most-significant-bits of the physical address for the staged memory item stored in that cache line. The validity bit field, consisting of bit 10, indicates whether the cache line contains valid data. The parity bit field, consisting of bit 11, is used for parity checking of the secondary cache tag. During operation, the cache tag parity bit is not checked if the cache tag validity bit is clear. Also, a cache tag parity error results in a secondary cache miss and is not seen by system software.

Figure 6:
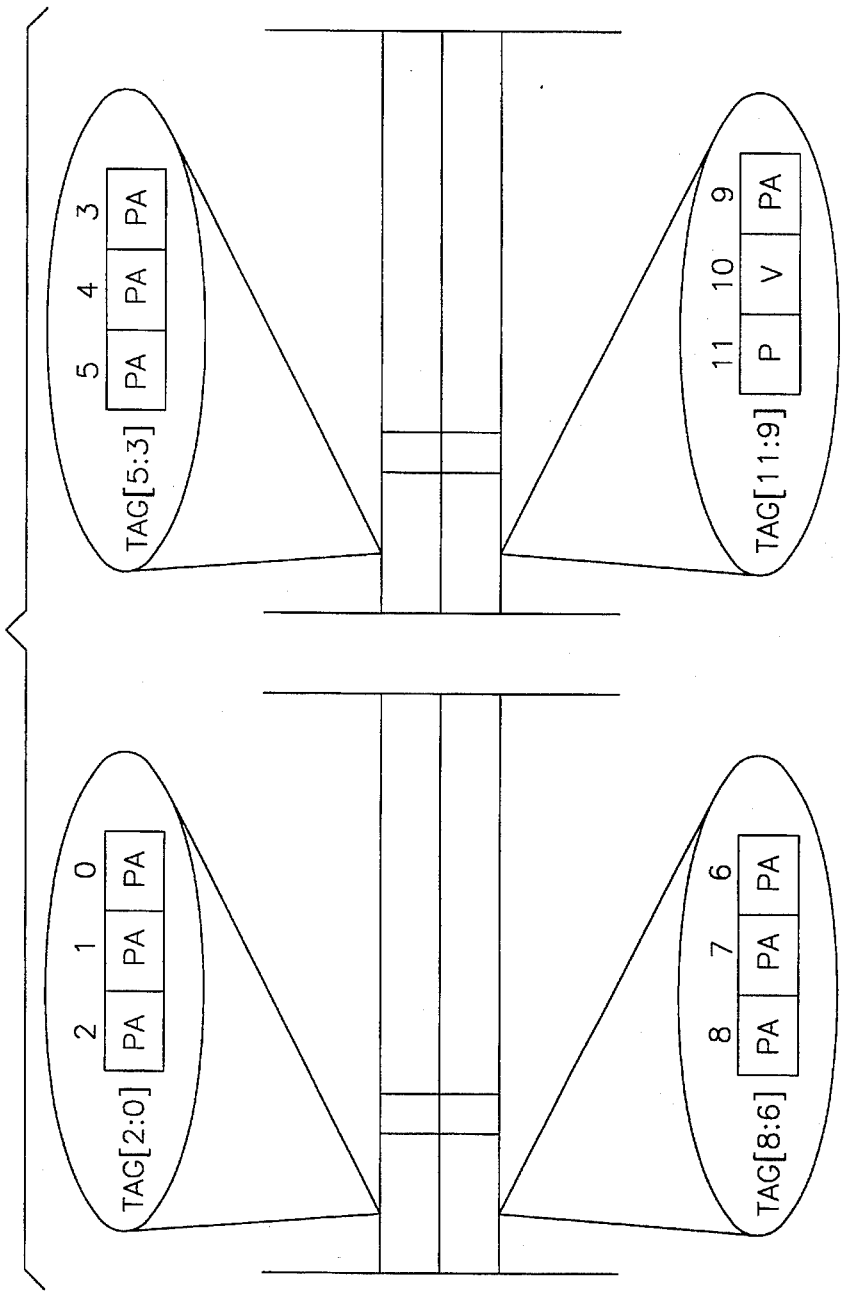
FIG. 6 is a diagram illustrating the storage scheme of cache tag segments.

Secondary cache tags are stored in two contiguous cache entries in four three-bit segments. Referring to FIG. 6, a diagram illustrating the storage scheme of cache tag segments is shown. Since the cache line comprises four cache entries and since only two of these four entries are needed to store a cache tag, the cache tags can be redundantly stored and advantageously used to provide early detection of a cache hit or a cache miss.

By storing the cache tags twice, a cache hit or a cache miss can be detected after only two of the four cache entries comprising a cache line have been received by the microprocessor. Using a wraparound feature (described below), the secondary cache continues to send successive cache entries which become immediately available without incurring further delay since cache hits are detected early. Conversely, a cache miss only requires the cancellation of already received data.

In one embodiment of the invention, the microprocessor has an execution unit (not shown) with a multi-stage instruction pipeline (not shown). Preferably, the microprocessor is a pipeline processor which provides simultaneous or parallel processing of instructions using an overlapping of program instructions which are loaded, along with their data, and executed simultaneously in a conceptual pipe. The first two cache entries comprising a cache line are read before it is known whether a cache hit or a cache miss has occurred. Regardless, the data for both of these entries can be forwarded to the execution unit immediately upon receipt and placed into the instruction pipeline. One cache entry is received per clock cycle. Similarly, one stage of the pipeline is executed per clock cycle. Thus, the data from the first two entries will have been forwarded two stages into the instruction pipeline at the time at which a cache hit or a cache miss is detected. If a cache miss occurs, the microprocessor cancels the data and effectively removes it from the pipeline before it is used by the execution unit. If a cache hit occurs, the data is advantageously situated two stages deep in the pipeline and two clock cycles are saved.

In a more general sense applicable to not only microprocessors having a pipelined execution unit, the redundant storage of cache tags enables a microprocessor to determine whether a cache hit or a cache miss has occurred prior to the time at which a full cache line has been received.

The secondary cache employs a wraparound feature whereby one cache entry is output at each successive clock cycle. Referring back to FIG. 2, asserting a low on the strobe control signal indicates that a cache entry address has been asserted on the cache address bus 4. In response, the secondary cache sends the cache entry stored at the address asserted on the address bus 4. If a low is also asserted on the advance control signal, the secondary cache will continue to send the cache entries located in successive memory locations in the secondary cache, one entry per clock cycle. The secondary cache uses a modulo-4 counter to cause the cache to wraparound to the beginning of a cache line when the end of a cache line has been encountered before the four cache entries comprising the cache line have been sent. By using a wraparound feature, the microprocessor need only assert one cache entry address which need not correspond to a 32-byte boundary for the full four-entry cache line.

Referring to FIG. 7, a logic diagram showing a cache hit or miss detection circuit is shown. The purpose of this circuit is to detect a cache hit or a cache miss by comparing the upper and lower segments of a cache tag for cache entries received on consecutive clock cycles. First, one-half of the cache tag is compared and its result stored. Then, during the next clock cycle, the other half of the cache tag is compared and its result and the result from the previous comparison are jointly compared to determine whether both the upper and the lower segments have matching results. If so, a cache hit has occurred. Otherwise, a cache miss has occurred.

The circuit is internal to the microprocessor. Recall that the cache tag physical address field contains the 10 most-significant bits of the physical address of the staged memory item stored in that cache line. Since each cache tag is stored in two consecutive cache entries, they are received from the secondary cache over the data bus into two six-bit segments T[5:0]. Each segment, as received from the secondary cache, is forwarded along internal cache tag bus 80 to register 81 for temporary storage. The 10 most-significant bits of the requested memory item PA[27:18] are asserted on an internal physical address bus 82 and divided into two five-bit segments with the five least-significant bits PA[22:18] and the five most-significant bits PA[27:23] asserted on internal buses 83 and 84, respectively.

The stored cache tag segment in register 81 is compared to both five-bit physical address segments using exclusive NOR (XNOR) logic gates 85 and 86. The results from the XNOR operations are selected using multiplexor 87 to select the appropriate result based on whether an upper or lower cache tag segment is being compared. The SEL_LOW_TAG signal is asserted on control signal 88 as an input to multiplexor 87 to select an upper or lower cache tag segment comparison result.

The result from multiplexor 87 is both stored in register 89 and forwarded to AND logic gate 90. Register 89 contains the results of the comparison operation determined in the previous clock cycle and is forwarded to the AND logic gate 90 upon the next successive clock cycle as asserted on IO_CLK SIGNAL 97. A current tag segment hit is indicated along line 90. A previous tag segment hit is indicated along line 91. The values asserted on both lines are compared by AND logic gate 92 which will assert a signal indicating a cache hit or a cache miss on line 93. If a cache miss has occurred and an enable cancel signal (ENB_CANCEL) is asserted on line 94, AND logic gate 95 asserts a cancel signal on line 96, thereby cancelling the data ready (DATA_RDY) signal having already been sent to the execution unit in the prior clock cycle. The cancellation causes, for instance, memory items in the instruction pipeline to be cancelled.

Referring to FIG. 8, a logic diagram showing a cache entry parity checking circuit is shown. Its purpose is to determine whether a parity error has occurred for either 36-bit segment comprising a cache entry. The circuit is internal to the microprocessor. Assuming there is no parity error, an internal DATA_RDY signal is asserted and thereby indicates that there is valid data from the secondary cache. The 64-bits of cache data and 2 parity bits received over the data bus 6 from the secondary cache are divided into two 32-bit segments D[63:32] and D[31:0] and 2 individual parity bits P[1] and P[0]. The cache data segments are asserted on internal cache data buses 100 and 101 and the parity bits along internal parity buses 102 and 103. The cache data is input to XOR logic gates 104 and 105 to determine the parity of the cache data segments. That result, in turn, is compared to the parity bit for that segment using XOR logic gates 106 and 107. That result is compared by OR logic gate 108 and stored in register 109. The register forwards the result on the next clock cycle as asserted on CPU_CLK signal 110. If an enable ready signal (ENB_READY) 111 is asserted and there is no parity error as determined by AND logic gate 110, a data ready (DATA_RDY) signal 112 is asserted indicating a valid cache entry has been received without any parity errors.

The cache memory system utilizes a write-through cache coherency protocol. Upon the execution of a write operation, new data is written simultaneously to the secondary cache and main memory. All memory writes update the cache tag. A non-block (non-cache line) write purges the cache tag entry while a block-write updates it. Upon the execution of a read operation, a non-block read bypasses the secondary cache while a block-read results in a secondary cache look-up. If the look-up is a cache miss, the corresponding main memory data is written into the secondary cache upon being available and the cache tag is updated accordingly.

The memory items staged in the secondary cache are checked for parity errors upon receipt in the microprocessor 2. If a parity error is encountered in the first two cache data entries, the parity error is treated like a cache miss and already-read data is cancelled and the cache tag updated. If a parity error is encountered in the last two cache data entries, the parity error results in a parity error being issued. A parity error on an external main memory block read, assuming there was a secondary cache miss, purges the indexed secondary cache line.

Figure 9:
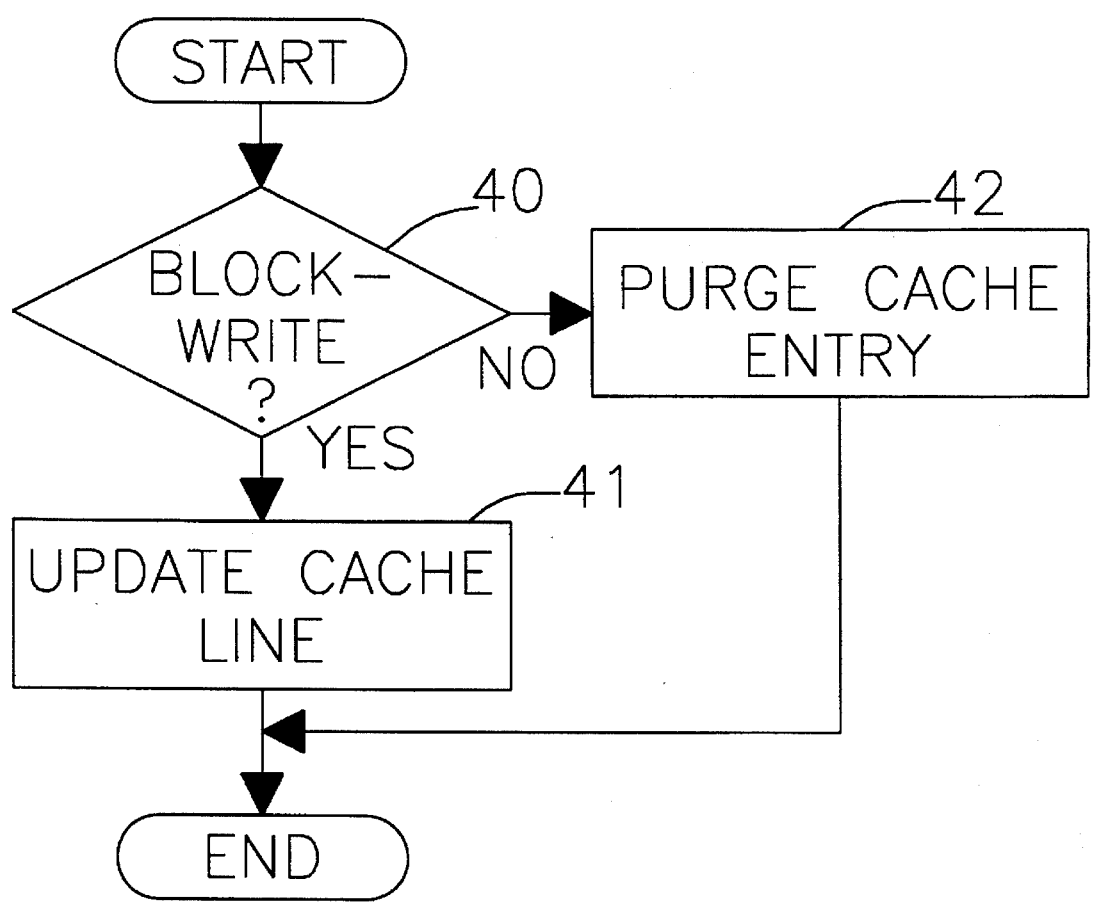
FIG. 9 is a flow chart illustrating the cache coherency protocol for a write operation.

Referring to FIG. 9, a flow chart illustrating the cache coherency protocol for a write operation is shown. If the write is attempting a block-write (block 40), the cache is updated by replacing the cache line and its tag (block 41). Otherwise, if a non-block write is being performed, the cache line is purged by invalidating or setting to a null value the cache tag with four consecutive cache entry writes (block 42).

Figure 10:
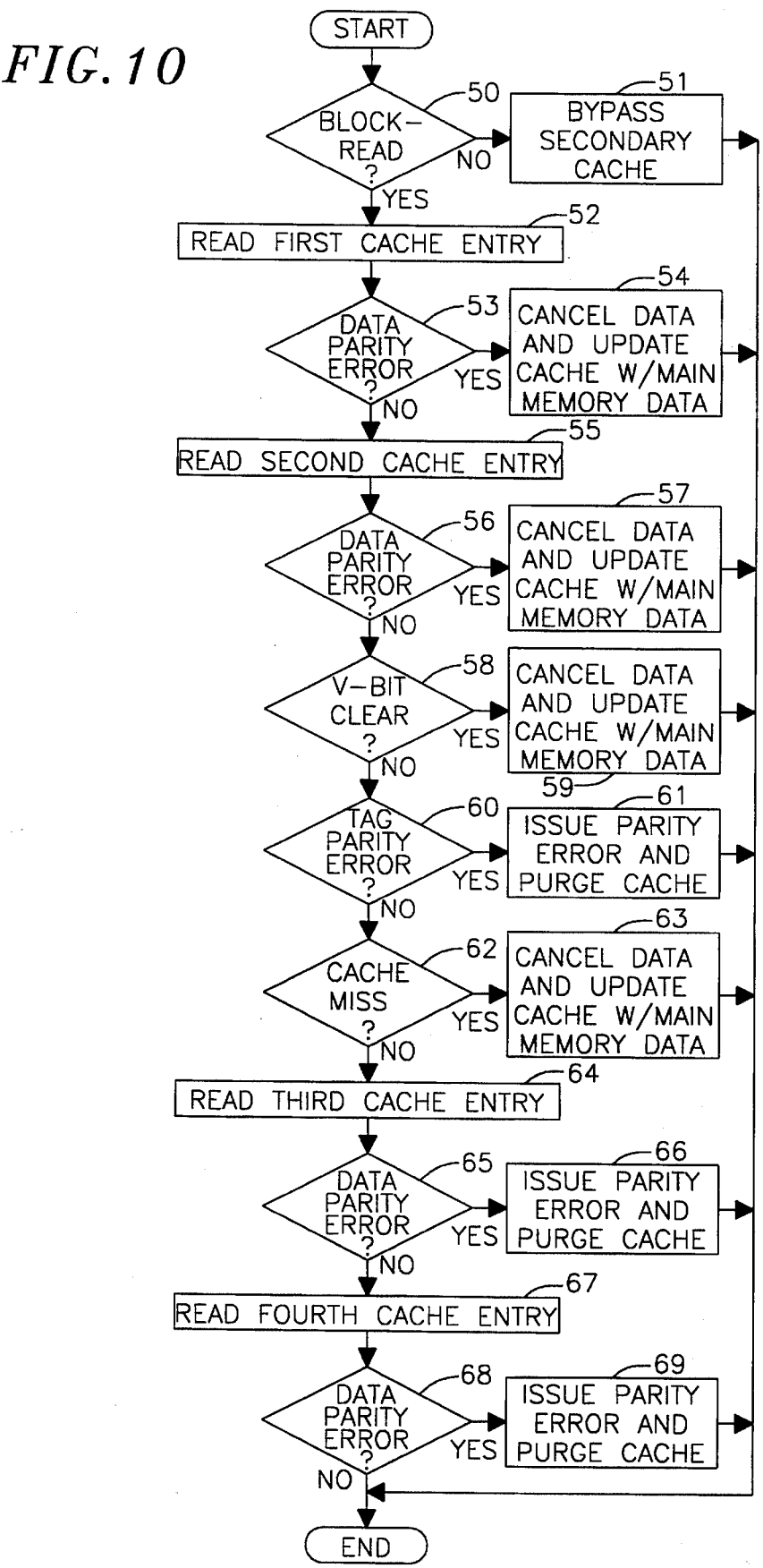
FIG. 10 is a flow diagram illustrating the cache coherency protocol for a read operation.

Referring to FIG. 10, a flow diagram illustrating the cache coherency protocol for a read operation is shown. If a non-block read is being performed (block 50), the secondary cache is bypassed and the data read directly from main memory (block 51). Otherwise, a secondary cache look-up is performed. The first cache entry is read (block 52) and if a data parity error is detected (block 53), the data is cancelled and the cache line updated with main memory data upon its becoming available (block 54). Otherwise, the second cache entry is read (block 55) and if a data parity error is detected (block 56), the data is cancelled and the cache line updated with main memory data upon its becoming available (block 57).

Assuming that no parity errors occurred in either the first or second cache entries, a full cache tag will have been received and the early detection of a cache hit or a cache miss can be performed beginning at block 58. The cache tag validity bit is checked and if it is clear (block 58), the cache line contains invalid data which is cancelled, and the cache line updated with main memory data upon its becoming available (block 59). Otherwise, the cache tag parity bit is checked and if a parity error is detected (block 60), a parity error is issued and the cache line purged (block 61). Otherwise, the cache tag is checked and if a cache miss is detected (block 62), the data is cancelled and the cache line updated with main memory data upon its becoming available (block 63). Assuming a cache hit has been detected, the third and fourth cache entries are read (blocks 64 and 67). If a data parity error is detected for either cache entry (blocks 65 and 68), a parity error is issued and the cache line is purged (blocks 66 and 69). Otherwise, the secondary cache lookup was successful.

Figure 11:
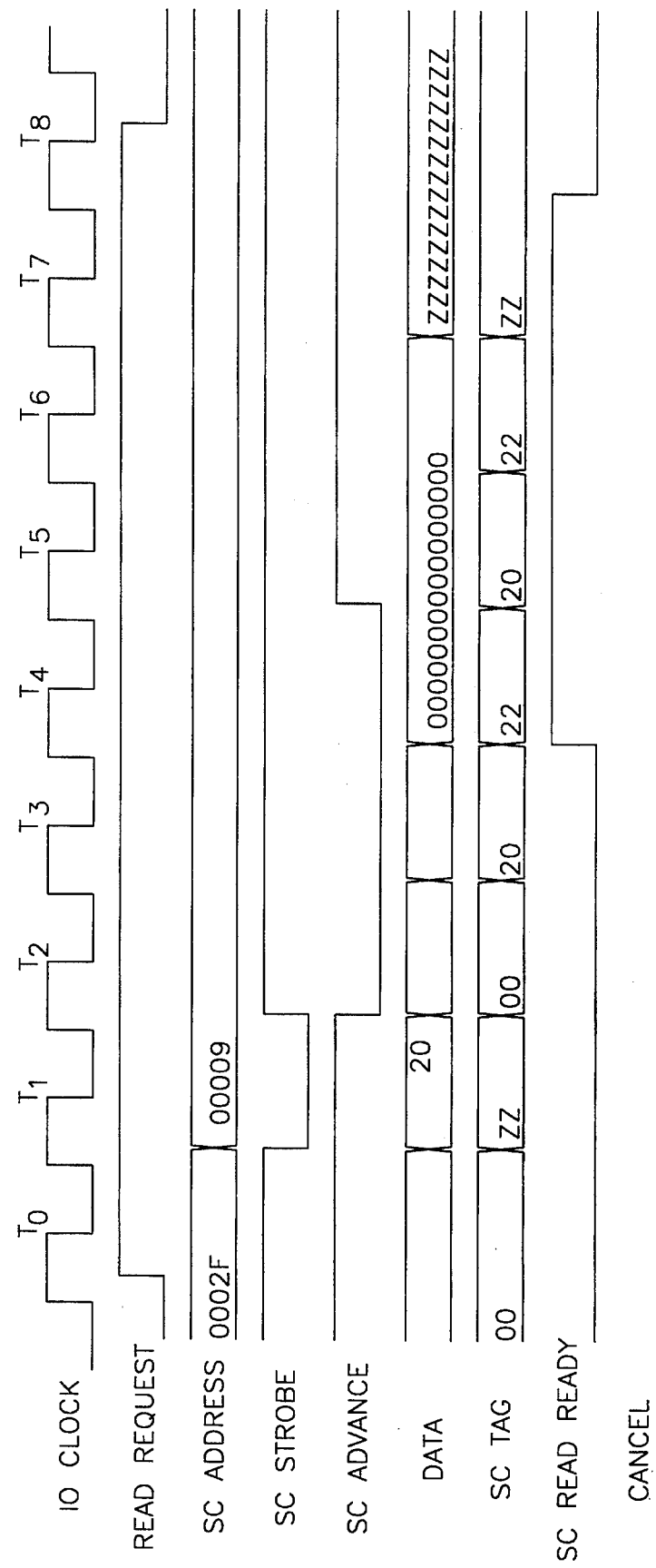
FIG. 11 is a timing diagram illustrating a secondary cache hit.

Referring to FIG. 11, a timing diagram illustrating a secondary cache hit is shown. A read request is made at time $T_0$. The secondary cache strobe control signal and the address for the cache line are asserted at time $T_1$. The secondary cache initiates the read operation and the microprocessor asserts the advance control signal indicating a sequential cache entry lookup at time $T_2$. The secondary cache begins sending the first cache entry at time $T_3$. The microprocessor receives the first cache entry and asserts a high speculative read ready (SC Read Ready) signal internally to indicate its receipt while the secondary cache begins to send the second cache entry at time $T_4$. The second cache entry, including the other half of a cache tag, is received at time $T_5$ and an early detection of a cache hit is made at time $T_5$. The remaining two cache entries comprising the cache line are received at times $T_6$ and $T_7$.

Figure 12:
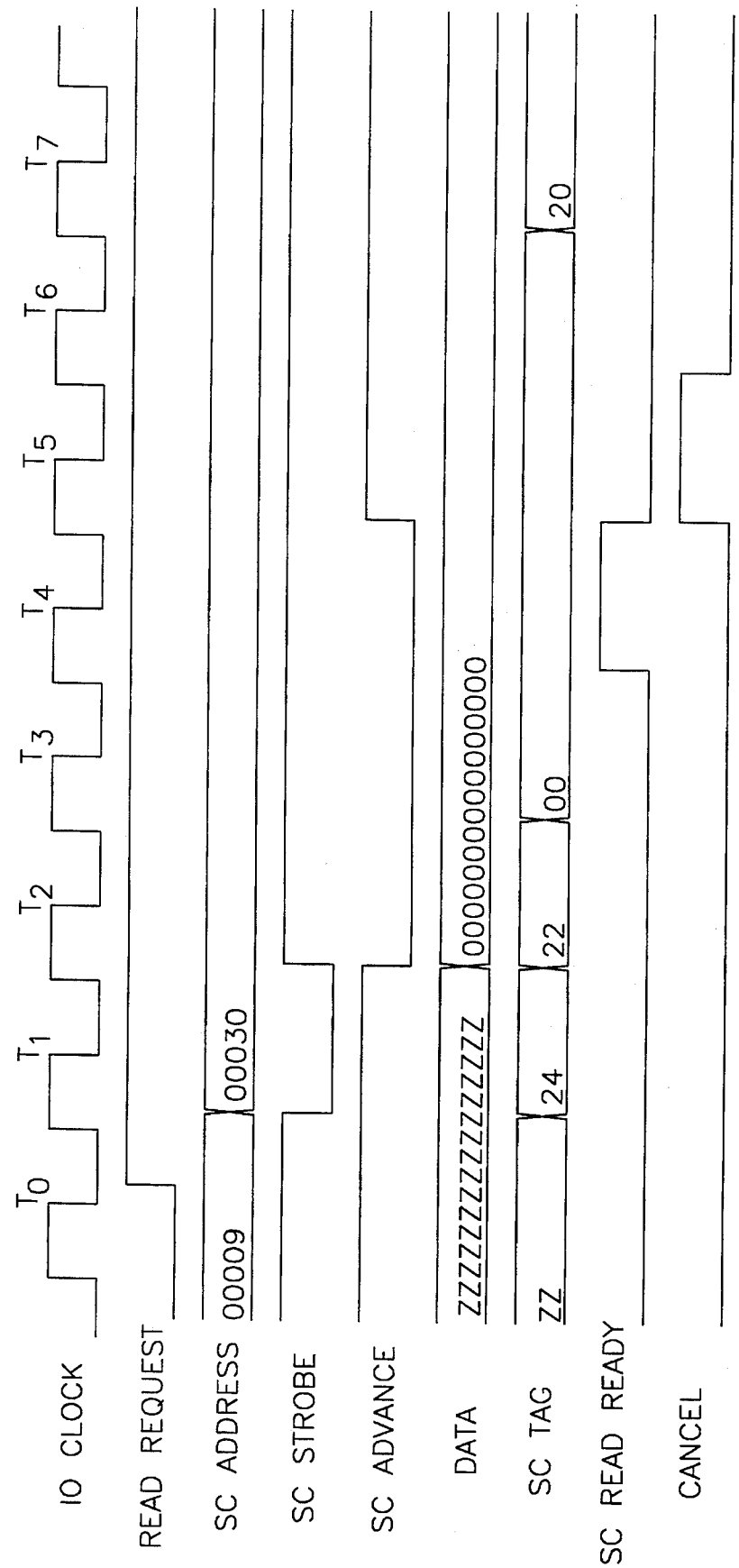
FIG. 12 is a timing diagram illustrating a secondary cache miss.

Referring to FIG. 12, a timing diagram illustrating a secondary cache miss is shown. A read request is made at time $T_0$. The secondary cache strobe control signal and the address for the cache line are asserted at time $T_1$. The secondary cache initiates the read operation and the microprocessor asserts the advance control signal indicating a sequential entry lookup at time $T_2$. The secondary cache begins sending the first entry at time $T_3$. The microprocessor receives the first cache entry and asserts a high speculative read ready signal internally to indicate its receipt while the secondary cache begins to send the second cache entry at time $T_4$. The second cache entry, including the other half of the cache tag, is received at time $T_5$ and an early detection of a cache miss is made. The microprocessor asserts a low read ready signal and asserts a high cancel signal upon detecting a cache miss.

Figure 13:
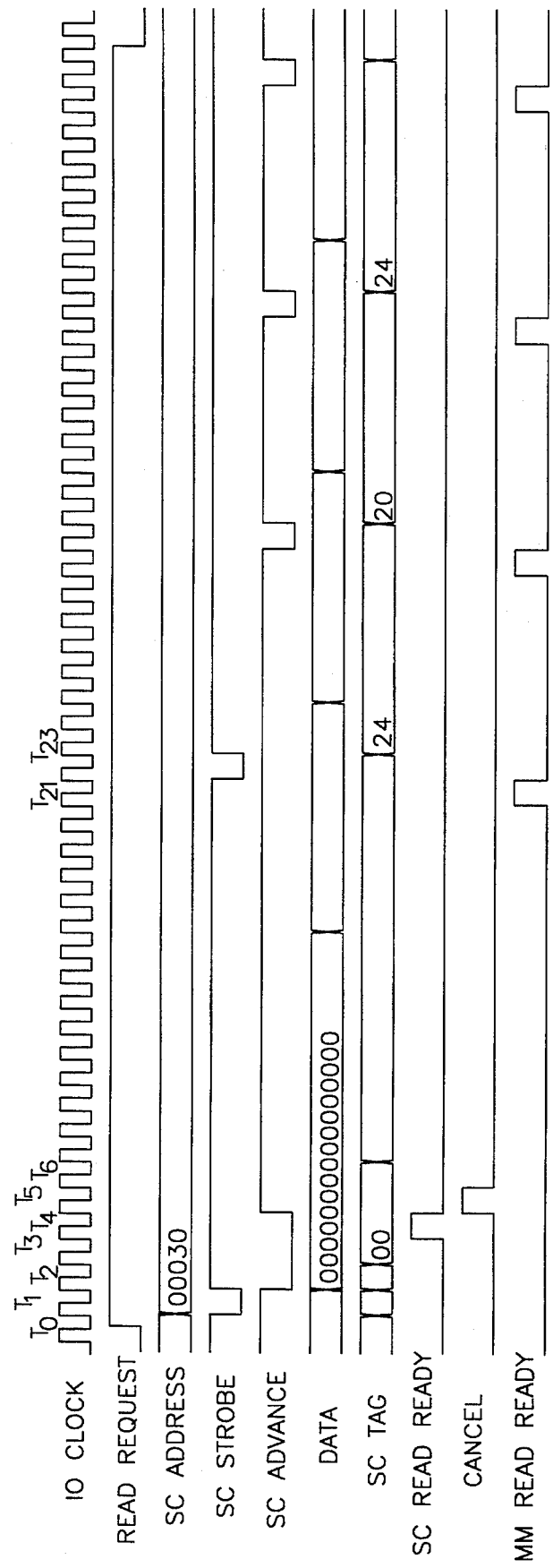
FIG. 13 is a timing diagram illustrating a secondary cache miss with a main memory read.

Referring to FIG. 13, a timing diagram of a secondary cache miss with a main memory read is shown. A read request is made at time $T_0$. The address for the cache line is asserted at time $T_1$. The secondary cache initiates the read operation and the microprocessor asserts the advance control signal indicating a sequential cache entry lookup at time $T_2$. The secondary cache begins sending the first cache entry at time $T_3$. The microprocessor receives the first cache entry and asserts a high speculative read ready signal internally to indicate its receipt while the secondary cache begins to send the second cache entry at time $T_4$. The second cache entry, including the other half of the cache tag, is received at time $T_5$ and an early detection of a cache miss is made. The microprocessor asserts a low read ready signal and asserts a high cancel signal upon detecting a cache miss. The contents of the secondary cache line are updated using the data received from the main memory beginning at time $T_{23}$ with a new cache entry received every nine clock cycles.

While the invention has been particularly shown and described as referenced to the embodiment thereof, it will be understood by those skilled in the art that the foregoing and other changes in form and detail may be made therein without departing from the spirit and scope of the invention.

What is claimed is:

1. A cache memory system for providing memory items staged from an external memory to a logic unit, comprising:

at least one single cache array structure comprising a plurality of cache entries for storing complete memory items and complete corresponding cache tags, each of the cache entries comprising a memory item section for storing a portion of each such memory item and a cache tag section for storing a portion of the corresponding cache tag, each such cache tag identifying at least one of the cache entries, the at least one single cache array structure being responsive to address signals for reading out the contents of the cache entries;

a logic circuit responsive to memory requests for generating the address signals and comprising means for comparing the cache tags to the memory requests for a predetermined relationship;

an address bus interconnecting the at least one single cache array structure and the logic circuit for carrying the address signals to the at least one single cache array structure; and a data bus interconnecting the at least one single cache array structure and the logic circuit for carrying the cache tags and the memory items between the at least one single cache array structure and the logic circuit.

2. A cache memory system according to claim 1, wherein each of the cache entries further comprises a parity indicator section for storing a parity indicator, each such parity indicator for indicating a parity error in at least one of the cache entries; the data bus further comprises a parity bus for carrying the parity indicator between the at least one single cache array structure and the logic circuit; and the logic circuit further comprises means for checking the parity indicator to determine whether a parity error has occurred and means for cancelling the memory item responsive to the parity error.

3. A cache memory system according to claim 1, wherein the at least one single cache array structure sends the contents of a series of consecutive cache entries, the logic circuit further comprises means responsive to the predetermined relationship being a cache miss for indicating that the at least one single cache array structure is to stop sending out the contents of the series.

4. A cache memory system according to claim 1, wherein the logic circuit provides an advance signal to the at least one single cache array structure for indicating that the at least one single cache array structure is to read out the contents of a series of consecutive cache entries and the at least one single cache array structure further comprises means responsive to the absence of the advance signal for terminating the reading out of the contents of the series.

5. A cache memory system according to claim 1, wherein the logic circuit further comprises means for generating a strobe signal for indicating that the address signals are being asserted on the address bus and that the at least one single cache array structure is to send the contents of a first cache entry and means for generating an advance signal for indicating that the at least one single cache array structure is to sequentially send the contents of consecutive cache entries while the advance signal is asserted; and the system further comprises at least one control line interconnecting the at least one single cache array structure and the logic circuit for carrying the strobe signal and the advance signal to the at least one single cache array structure.

6. A cache memory system according to claim 1, wherein the cache entries are grouped into a plurality of cache lines, each such cache line comprising a series of consecutive cache entries and the at least one single cache array structure further comprises means for causing the contents of the cache lines to be sequentially sent over the data bus.

7. A cache memory system according to claim 6, wherein each of the cache lines is identified by a plurality of identical cache tags, at least one of the identical cache tags for each cache line being stored in a different one of the cache entries for the corresponding cache line, the comparing means further comprising means for comparing the first in a series of the identical cache tags of a corresponding cache line for a mismatch between the first identical cache tag and one of the memory requests, a match between the first identical cache tag and one of the memory requests comprising an early detected cache hit and a mismatch comprising an early detected cache miss.

8. A cache memory system according to claim 6, wherein each of the cache lines is identified by a cache tag, each such cache tag being divided into a plurality of segments, each such segment being stored in one of the plurality of cache tag sections for the cache line, and the logic circuit further comprises means for receiving a plurality of cache tag segments for a cache line, each such segment being sequentially sent from the at least one single cache array structure over the data bus, means for comparing each of the cache tag segments to the memory request, and means for generating a cancel signal responsive to a mismatch between one of the cache tag segments and the memory request.

9. A cache memory system according to claim 1, wherein each of the cache tags has a validity indicator, the logic circuit further comprising means for checking the validity indicator of a cache tag to determine if the validity indicator is clear, thereby indicating the cache line contains invalid memory items and means for cancelling memory items carried between the at least one single cache array structure and the logic circuit responsive to a cleared validity indicator.

10. A cache memory system according to claim 1, wherein each of the cache tags has a parity indicator, the logic circuit further comprises means for checking the parity indicator of a cache tag for a corresponding cache line to determine whether a parity error has occurred and means for enabling the corresponding cache line to be purged.

11. A method using a cache memory system for storing staged memory items and cache tags within a single cache array structure, the structure comprising a section for storing the staged memory items and a section for storing the cache tags, the cache tags for identifying the staged memory items, comprising the steps of:

generating address signals using a logic circuit responsive to a memory request from an execution unit and asserting the address signals along an address bus interconnecting the logic circuit and the cache array structure;

selecting a cache line comprising a plurality of cache entries located in contiguous sections of the structure responsive to the address signals, each such cache entry comprising a plurality of the staged memory items and one cache tag corresponding to the cache line;

sequentially sending each of the plurality of the staged memory items and at least part of the corresponding cache tag to the logic circuit along a data bus interconnecting the logic circuit and the cache array structure; and detecting an early cache hit or an early cache miss upon receipt of a first of the plurality of cache entries, a cache hit comprising a match between the cache tag and the memory request and a cache miss comprising a mismatch between the cache tag and the memory request.

12. A method according to claim 11, further comprising the step of:

asserting a cancel signal to the execution unit to cancel those of the plurality of the staged memory items received prior to the receipt of the first of the plurality of cache entries when a cache miss is detected in the step of detecting.

13. A method according to claim 11, further comprising the steps of:

first asserting a strobe signal in conjunction with the address signals, the strobe signal indicating that the address signals are being asserted on the address bus; and then asserting an advance signal indicating that the structure is to continuously send each of the plurality of consecutive cache entries until the advance signal is not asserted and the entire cache line has been sent.

14. A method according to claim 11, wherein the structure further comprises a section for storing data parity indicators and each such cache entry further comprises a plurality of data parity indicators, each of the plurality of data parity indicators corresponding to one of the plurality of the staged memory items in that cache entry, further comprising the steps of:

determining whether a data parity error has occurred using the data parity indicator upon receipt of each of the plurality of the staged memory items and their corresponding data parity indicators up through the receipt of the first of the plurality of cache entries; and cancelling those of the plurality of the staged memory items upon the detection of a data parity error that were received up through the receipt of the one of the plurality of the staged memory items having a data parity error.

15. A method according to claim 14, wherein each such cache tag further comprises a cache tag parity indicator, further comprising the steps of:

determining whether a cache tag parity error has occurred using the cache tag parity indicator upon receipt of a first of the plurality of cache entries;

determining whether a data parity error has occurred using the data parity indicator upon receipt of each of the plurality of the staged memory items and their corresponding data parity indicators after the receipt of the first of the plurality of cache entries; and issuing a parity error signal to the execution unit and purging the cache line upon the detection of a cache tag parity error or a data parity error.

16. A cache memory system for storing staged memory items and cache tags within a single cache array structure, the structure comprising a section for storing the staged memory items and a section for storing the cache tags, the cache tags for identifying the staged memory items, comprising:

means for generating address signals using a logic circuit responsive to a memory request from an execution unit and means for asserting the address signals along an address bus interconnecting the logic circuit and the cache array structure;

means for selecting a cache line comprising a plurality of cache entries located in contiguous sections of the structure responsive to the address signals, each such cache entry comprising a plurality of the staged memory items and one cache tag corresponding to the cache line;

means for sequentially sending each of the plurality of the staged memory items and at least part of the corresponding cache tag to the logic circuit along a data bus interconnecting the logic circuit and the cache array structure; and means for detecting an early cache hit or an early cache miss upon receipt of a first of the plurality of cache entries, a cache hit comprising a match between the cache tag and the memory request and a cache miss comprising a mismatch between the cache tag and the memory request.

17. A cache memory system according to claim 16, further comprising:

means for asserting a cancel signal to the execution unit to cancel those of the plurality of the staged memory items received prior to the receipt of the first of the plurality of cache entries when a cache miss is detected by the detecting means.

18. A cache memory system according to claim 16, further comprising:

means for asserting a strobe signal in conjunction with the address signals, the strobe signal indicating that the address signals are being asserted on the address bus; and means for asserting an advance signal indicating that the structure is to continuously send each of the plurality of consecutive cache entries until the advance signal is not asserted and the entire cache line has been sent.

19. A cache memory system according to claim 16, wherein the structure further comprises a section for storing data parity indicators and each such cache entry further comprises a plurality of data parity indicators, each of the plurality of data parity indicators corresponding to one of the plurality of the staged memory items in that cache entry, further comprising:

means for determining whether a data parity error has occurred using the data parity indicator upon receipt of each of the plurality of the staged memory items and their corresponding data parity indicators up through the receipt of the first of the plurality of cache entries; and means for cancelling those of the plurality of the staged memory items upon the detection of a data parity error that were received up through the receipt of the one of the plurality of the staged memory items having a data parity error.

20. A cache memory system according to claim 19, wherein each such cache tag further comprises a cache tag parity indicator, further comprising:

means for determining whether a cache tag parity error has occurred using the cache tag parity indicator upon receipt of a first of the plurality of cache entries;

means for determining whether a data parity error has occurred using the data parity indicator upon receipt of each of the plurality of the staged memory items and their corresponding data parity indicators after the receipt of the first of the plurality of cache entries; and means for issuing a parity error signal to the execution unit and purging the cache line upon the detection of a cache tag parity error or a data parity error.

21. A cache memory system for selectively providing memory items staged from a main memory to a cache memory, either from the main memory or if present therein, from the cache memory, the system comprising:

in the cache memory, a plurality of cache memory arrays, each such cache memory array storing a portion of each of the staged memory items and a portion of a cache tag identifying one of the corresponding staged memory items, the cache memory responding to received addresses for reading out to a logic circuit over at least one bus the portions of selected ones of the staged memory items and the portions of the corresponding cache tag;

the logic circuit responding to requests for memory access to the main memory for generating addresses, the logic circuit comprising means for comparing the cache tag received from the cache memory and the request for memory access for a predetermined relationship; and the at least one bus for carrying the addresses, the staged memory items and the cache tag between the plurality of cache memory arrays and the logic circuit.

22. A cache memory system according to claim 21, wherein there are a plurality of staged memory item portions for each of the memory items and a plurality of cache tag portions for each of the cache tags, each such cache tag portion corresponding to one of the staged memory item portions, each such staged memory item portion and the corresponding cache tag portion being stored in and read out in association with each other from the single cache memory array.

23. A cache memory system according to claim 22, wherein the cache tag for each memory item comprises duplicate cache tags each corresponding to different ones of the memory item portions for the same memory item, each duplicate cache tag comprising a plurality of duplicate cache tag portions, the means for comparing being adapted for comparing each of the duplicate cache tag portions in a sequence, detection of a mismatch between the request for access and a first of the series of duplicate cache tag portions for one the memory item and for forming a mismatch indicator.

24. A cache memory system for selectively providing memory items staged from a main memory to a cache memory, either from the main memory or, if present therein, from the cache memory, comprising:

the cache memory storing a plurality of memory items, and corresponding to each memory item, duplicate cache tags, each of the duplicate cache tags identifying the same corresponding memory item, each such memory item comprising a plurality of memory item portions which each has stored in association therewith one of the duplicate cache tags, the cache tag memory responsive to received addresses for reading out the memory items and the corresponding duplicate cache tags;

a logic circuit responsive to a request for memory access to the main memory for generating addresses and comprising means for comparing one of the duplicate cache tags for a predetermined relationship before an other of the duplicate cache tags is compared; and at least one bus for carrying the addresses, the memory items and the corresponding duplicate cache tags between the cache memory and the logic circuit.

25. A cache memory, for use in a cache memory system, for selectively providing memory items to a logic circuit, either from a main memory or if present therein, from the cache memory, the cache memory items staged from the main memory to the cache memory, comprising:

means for storing a plurality of memory items, and corresponding to each such memory item, a duplicate cache tag, each of the duplicate cache tags identifying the corresponding memory item, the plurality of memory items each comprising a plurality of memory item portions which each has stored in association therewith one of the duplicate cache tags, the cache tag memory responsive to addresses received from the logic circuit for reading out the memory items in a sequence along with the corresponding duplicate cache tag; and at least one bus for carrying the addresses, the memory items and the corresponding duplicate cache tag between the cache memory and the logic circuit.

26. A cache memory for providing memory items staged from an external memory to a logic unit, the logic unit being responsive to memory requests for generating address signals, the memory requests comprising requests for memory items having cache tags in a predetermined relationship to the memory requests, comprising:

a cache array comprising at least one single cache array structure comprising a plurality of cache entries, each of the cache entries comprising a memory item section for storing a portion of a memory item and a cache tag section for storing a portion of a corresponding cache tag, each such cache tag identifying at least one of the cache entries; and means responsive to address signals sent from the logic circuit over an address bus for reading out the contents of at least one of the cache entries over a data bus, both buses interconnecting the cache array and the logic circuit.

* * * * *

UNITED STATES PATENT AND TRADEMARK OFFICE
CERTIFICATE OF CORRECTION

PATENT NO. : 5,617,347
DATED : March 17, 1995
INVENTOR(S) : Mogens Lauritzen

It is certified that error appears in the above-indentified patent and that said Letters Patent is hereby corrected as shown below:

Title page, item [57],
Abstract, line 2, "an, external" should read -- an external --.

Signed and Sealed this

Tenth Day of February, 1998

Attest:

BRUCE LEHMAN

*Attesting Officer*    *Commissioner of Patents and Trademarks*